(12) United States Patent
Brunard et al.

(10) Patent No.: US 8,092,694 B2
(45) Date of Patent: Jan. 10, 2012

(54) SECONDARY FILTRATION DEVICE APPLICABLE TO A THREE-PHASE PROCESS

(75) Inventors: Nathalie Brunard, Chaponost (FR); Jean Christophe Viguie, Lyons (FR); Matthieu Rolland, Vernaison (FR)

(73) Assignees: IFP Energies Nouvelles, Ruiel Malmaison Cedex (FR); ENI S.p.A., San Donato Milanese, Milan (IT)

( * ) Notice: Subject to any disclaimer, the term of this patent is extended or adjusted under 35 U.S.C. 154(b) by 639 days.

(21) Appl. No.: 12/158,428

(22) PCT Filed: Dec. 1, 2006

(86) PCT No.: PCT/FR2006/002648
§ 371 (c)(1),
(2), (4) Date: Sep. 23, 2008

(87) PCT Pub. No.: WO2007/080247
PCT Pub. Date: Jul. 19, 2007

(65) Prior Publication Data
US 2009/0008305 A1    Jan. 8, 2009

(30) Foreign Application Priority Data

Dec. 20, 2005  (FR) .................................... 0513207

(51) Int. Cl.
*B01D 24/08*   (2006.01)
*B01D 24/12*   (2006.01)
*B01D 37/00*   (2006.01)

(52) U.S. Cl. .................. 210/807; 210/289; 210/290

(58) Field of Classification Search .............. 210/283, 210/284, 290, 315–317, 335, 338, 342, 807, 210/289; 422/147; 518/728; 208/950
See application file for complete search history.

(56) References Cited

U.S. PATENT DOCUMENTS

| 1,838,263 | A |   | 12/1931 | Kelley |
|---|---|---|---|---|
| 1,992,420 | A |   | 2/1935 | Gleason |
| 2,266,368 | A | * | 12/1941 | Hull et al. ..................... 425/199 |
| 2,883,261 | A | * | 4/1959 | McGeorge, Jr. ............... 264/169 |
| 3,382,983 | A |   | 5/1968 | Stewart |
| 4,591,437 | A |   | 5/1986 | Ernryd et al. |
| 5,527,473 | A | * | 6/1996 | Ackerman ..................... 210/767 |
| 5,968,373 | A |   | 10/1999 | Choi |
| 6,488,842 | B2 | * | 12/2002 | Nagaoka ........................ 210/136 |
| 2002/0128330 | A1 |   | 9/2002 | Anderson |

FOREIGN PATENT DOCUMENTS

EP   0 925 818 A1   6/1999

* cited by examiner

*Primary Examiner* — Matthew Savage
(74) *Attorney, Agent, or Firm* — Millen, White, Zelano & Branigan, P.C.

(57) ABSTRACT

The present invention describes a device allowing secondary filtration of catalyst particles contained in an effluent from a process comprising a reactor operated in three-phase mode.

17 Claims, 3 Drawing Sheets

SECONDARY FILTRATION DEVICE APPLICABLE TO A THREE-PHASE PROCESS

FIELD OF THE INVENTION

The present invention describes a device for secondary filtration of catalyst particles contained in an effluent from a process comprising a reactor operated in three-phase mode, i.e. with a solid in suspension in a liquid phase and in the presence of a gas phase. Usually, said solid is a catalyst for the reaction and the liquid and/or solid are reagents. The liquid or the solid may also be inert in said reaction.

The present invention also concerns a separation process employing said device.

Thus, the present invention concerns the case of a Fischer-Tropsch process which can synthesize a very wide range of hydrocarbons from a mixture of carbon monoxide and hydrogen, termed synthesis gas. This process, which has been known since the 1930s, has been widely described and we shall summarize here the essential characteristics of it, carried out in a slurry type reactor.

A slurry reactor is a three-phase reactor in which the particles of catalyst in suspension in a liquid phase are very finely divided, typically with a mean size of the order of 5 microns to 700 microns, and are thus practically as one with the liquid phase containing them, said liquid phase itself being traversed by a stream of gas bubbles of very varied dimensions.

The complex hydrodynamic system constituted by solid particles of catalyst in suspension in a liquid hydrocarbon phase traversed by gas bubbles comprising hydrogen and carbon monoxide constitutes the medium known to the skilled person as a slurry in the context of the Fischer-Tropsch process. This term is also used in other fields and especially for other processes operated in the presence of a liquid phase and a gas phase.

The term "slurry" as used in the remainder of the text thus has the definition given above. An example of a slurry reactor is a perfectly stirred autoclave comprising a catalyst in suspension. Another example of a slurry reactor is a reactor comprising a catalyst in suspension in a liquid phase known as a slurry bubble column (SBC). In a SBC reactor, the gas is admitted, generally at the bottom of the reactor, into a vertical reactor several metres in diameter and which is very high (typically several tens of metres for an industrial reactor) comprising a liquid phase with a catalyst in suspension.

Separation of the solid catalyst particles and the suspension is an important aspect in three-phase reactors and more particularly in the Fischer-Tropsch process, as it partially determines the feasibility and costs of the process.

The separation device and process, which constitute the subject matter of the present invention, are of particular application to the separation of particles of catalyst in a three-phase process, for example a Fischer-Tropsch process carried out using a slurry. This device and process may also relate to any separation of solid particles, preferably with a diameter of less than 50 microns, and more preferably less than 20 microns, in suspension in any hydrocarbon medium.

PRIOR ART

United States patent application US-A1-2005/0004414 describes the elimination of ultra-fine particles which may clog the reactor, the device comprising a primary filter which is not described, and secondary catalytic filtration using a catalyst comprising at least one metal from groups VI or VIII deposited on a silica-alumina support. The document cited describes a mechanism for "desolubilizing" ultra-fine particles which precipitate in the pores of the particles constituting the catalytic filter.

The present invention differs from the catalytic mechanism described in that cited document since it is based on forming a cake on a first filtration medium followed by trapping deep inside a second filtration medium.

International patent application WO-A1-2005/005038 describes filtration through a filtration medium having openings 10 to 25 microns in size with the formation of a cake which is periodically backwashed, generally at the same time as the primary filtration is backwashed. In the present invention, there is no backwashing of the filtration medium and once saturated, the filtration system is replaced by a fresh system. The term "backwashing" in the context of that cited patent means passing a stream in the direction opposite to the process fluid to entrain particles deposited on the filtration medium.

Patent applications US-A1-2005/0000861 and US-A1-2004/0266894 describe a slurry Fischer-Tropsch process provided with a system for separating solid particles comprising primary filtration using a cartridge which may be located inside or outside the reactor, and secondary filtration, termed micro or ultrafiltration, which uses a very fine porous material the pore size of which is in the range of 0.002 to 0.1 microns. The secondary filtration system is connected to the primary filtration system to form a single coaxial assembly.

In the present invention, the secondary filtration system is independent of the primary filtration system and is located outside the reactor. As will be explained in detail below, the secondary filtration system of the invention is constituted by a granular bed comprising at least two distinct layers.

Figure 1:
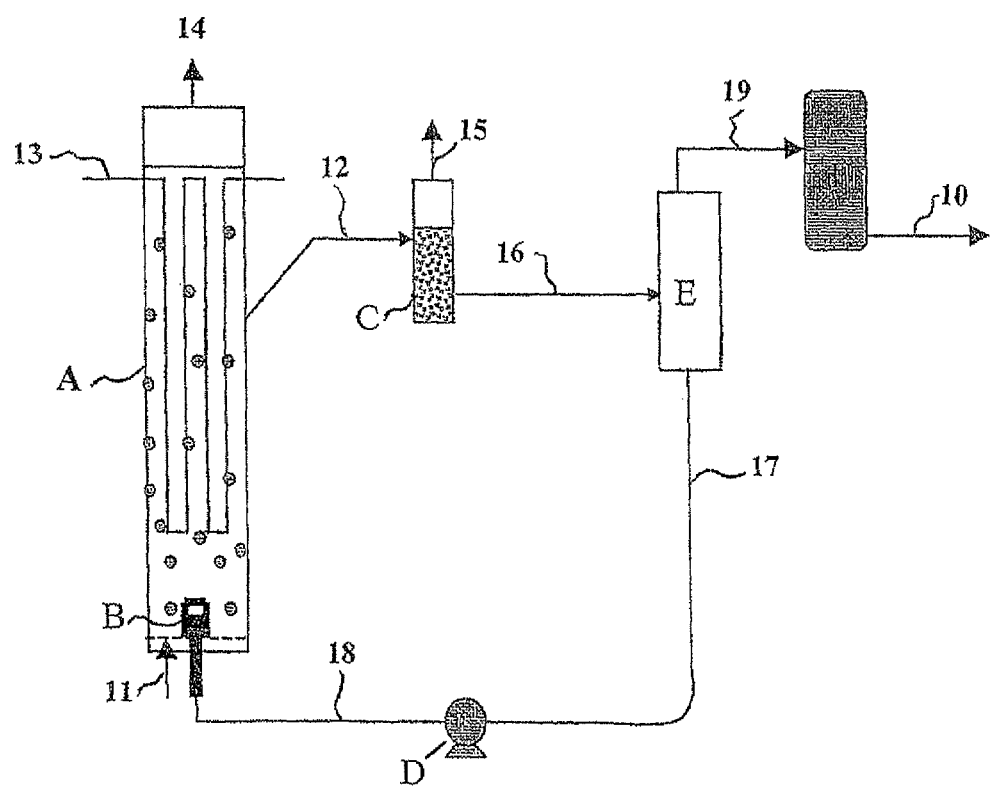
FIG. 1 is a view of the whole Fischer-Tropsch process functioning in slurry mode showing the positioning of the primary separation system and the secondary separation system of the invention.

The numbers or letters defining the various elements of the invention are referred to in the detailed description.

BRIEF DESCRIPTION OF THE INVENTION

The present invention consists of a secondary filtration device which is of particular application to a Fischer-Tropsch process for synthesizing hydrocarbons using a slurry type reactor. The separation device of the present invention is termed "secondary" in that it follows a primary separation device which can eliminate solid catalyst particles with a diameter of more than about 20 microns. The primary separation device does not constitute the subject matter of the present invention, but such a device may in particular be found in patent application US-A1-2005/0000861.

Any primary separation device which can eliminate that fraction of solid particles having a particle size of more than 50 microns, preferably more than 20 microns, is compatible with the secondary separation device of the present invention. In particular, it may be a primary separation device which operates by decanting or by filtration.

The present secondary separation device essentially consists of a granular bed comprising at least two layers:

a first layer, termed a holding layer, constituted by inert macroporous particles with a diameter in the range of 1 to 3 mm, preferably in the range of 1.5 to 2.5 mm;

a second layer, termed a deep filtration layer, constituted by inert particles with a size distribution in the range of 0.4 microns to 80 microns, with a mean diameter in the range of 25 microns to 35 microns.

The holding layer of the device of the invention generally has a mean porosity in the range of 60% to 75%, preferably in the range of 65% to 70%. The holding layer of the device of the invention will generally have a specific surface area in the range of 100 to 200 m$^2$/g, preferably in the range of 150 to 180 m$^2$/g. The holding layer may be unique or composed of a plurality of layers satisfying the particle diameter, porosity and specific surface area specifications between the limits indicated above. The total thickness of the holding layer or layers is in the range of 0.3 metres to 2 metres, preferably in the range of 0.5 metres to 1 metre.

Preferably, the deep filtration layer has a particle size distribution such that 5% to 20% of the volume of the layer is represented by particles with a diameter of less than 4 microns.

The deep filtration layer of the device of the invention generally has a void fraction in the range of 0.2 to 0.45 (i.e. between 20% and 45% by volume) and preferably in the range of 0.25 to 0.4. In the same manner as for the holding layer, the deep filtration layer may be unique or composed of several layers satisfying the particle diameter and particle size distribution specifications between the limits indicated above, i.e. a percentage of the fraction below 4 microns should preferably represent between 5% and 20% of the volume of the deep filtration layer or layers. The total thickness of the deep filtration layer or layers is in the range of 0.1 metres to 2 metres, preferably in the range of 0.2 metres to 1.5 metres.

The secondary separation device of the invention may have two functional modes:

an axial mode in which the fluid charged with particles traverses the device from top to bottom or from bottom to top depending on the disposition of the layers, the holding layer or layers always being traversed before the deep filtration layers;

a radial mode, in which the layers are in the form of concentric rings traversed laterally from the periphery to the centre or from the centre to the periphery, the holding layer or layers always being traversed before the deep filtration layer or layers.

The choice of axial or radial bed functional mode is essentially linked to the bulk of the device, but the performances of the device are the same in either mode.

DETAILED DESCRIPTION OF THE INVENTION

The present invention falls within the context of a process for synthesizing hydrocarbons from a gaseous mixture comprising carbon monoxide and hydrogen, generally termed synthesis gas, in a slurry type reactor as defined above. However, it is more generally applicable to any separation of solid particles with a diameter of less than 50 microns, preferably less than 20 microns, said particles being in suspension in a liquid hydrocarbon phase.

The slurry reactor in the case of a Fischer-Tropsch process operates in a temperature range of 150° C. or more, generally in the range of 100° C. to 350° C., preferably in the range of 170° C. to 280° C., at a pressure generally in the range of 0.5 to 20 MPa (1 MPa=10$^6$ pascals), preferably in the range of 1 to 10 MPa, more preferably in the range of 1.5 to 4 MPa, and in the presence of a catalyst initially divided into fine particles with a diameter in the range of 5 to 700 microns, preferably in the range of 10 to 500 microns, more preferably in the range of 20 to 400 microns. Further, the initial grain size of said catalyst may change by attrition and the percentage of fine particles thus has a tendency to increase with time.

Thus, it is important to have available means which can eliminate the finest particles initially present or formed over time, i.e. those with a diameter of less than 100 microns, preferably less than 80 microns and in some cases with much smaller diameters: of the order of a few microns (1 to 10 microns) or even less than 1 microns.

Fischer-Tropsch catalysts typically comprise cobalt or iron distributed on a support based on at least one oxide of the following metals or mixtures thereof: silicon (Si), titanium (Ti), aluminium (Al), zirconium (Zr) or magnesium (Mg).

A typical flowchart for a Fischer-Tropsch synthesis process functioning in slurry mode is shown in FIG. 1.

In FIG. 1, the fluidized reactor (A) operates in slurry mode with an internal exchanger comprising one or more cooling loops 13 supplied with a cooling fluid (liquid or vapour). The gas feed is introduced into the reactor by means of the distributor (B) and a line 11. A liquid recirculation loop containing part of the gas is extracted at an upper point of the reactor via a line 12 and supplies a degasser denoted (C). Gas is eliminated via lines 14 and 15 and the liquid phase is extracted from the degasser (C) via a line 16, then introduced into the primary separation system (E). From this separation system (E), a first liquid fraction 17 is extracted which supplies the slurry reactor via a pump (D) and a line 18, and a second liquid fraction 19 which supplies the secondary filtration device (F). A liquid product satisfying the solid particle content specifications is recovered via a line 10.

The slurry reactor comprises a system (E) for primary separation of catalyst particles, which is not described in the present application, but which is preferably either of the decanter type or a system of filtration cartridges. This primary separation system may be either external to the reactor as indicated in FIG. 1, or internal to said reactor (not shown).

The solid particle separation device is completed by a secondary filtration (F) forming the subject matter of the present invention, which can reduce the concentration of particles in effluents from the reactor to less than 10 ppm (parts per million), and preferably to less than 5 ppm.

The solid particles to be separated in the secondary filtration system are very fine particles of tungsten catalyst having a diameter of less than 50 microns, and usually, depending on the performance of the primary separation, less than 20 microns. These particles may comprise ultra-fine particles with a size of less than a micron (also termed submicronic particles). The concentration of fine particles at the inlet to the secondary filtration system is generally in the range of 50 to 500 ppm.

The secondary separation device is essentially constituted by a bed comprising at least two distinct layers of particles, a first layer intended to facilitate the formation of a cake, also termed the holding layer, and a second layer intended to deep trap the fine catalyst particles, also termed the deep filtration layer.

The term "first" and "second" layer should be construed as being such in the direction of flow of the fluid charged with solid particles. The first layer is traversed by the particle-charged fluid before the second layer.

Figure 2:
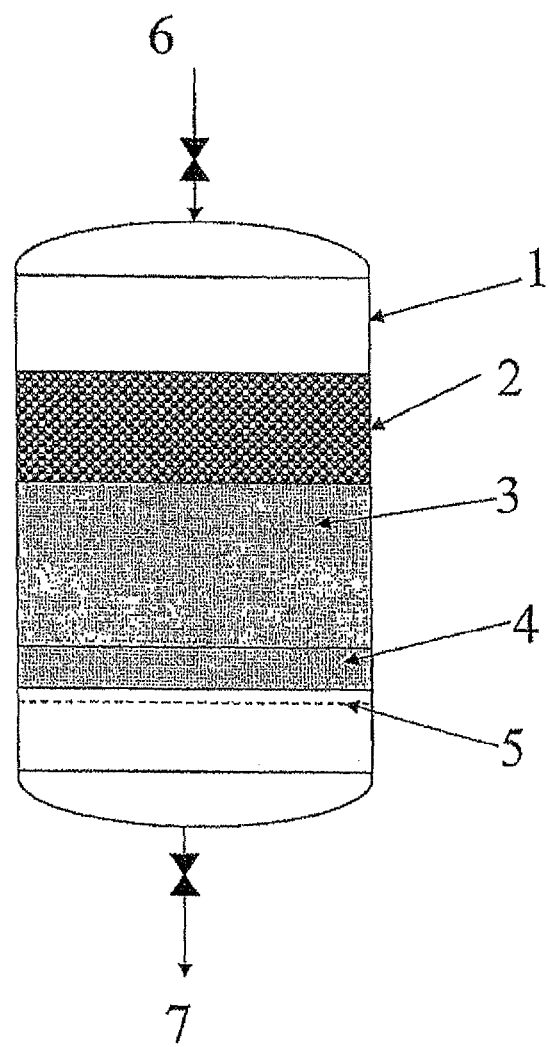
FIG. 2 shows a view of an axial secondary filtration bed of the invention with its various layers.

FIG. 2 shows a secondary filtration device of the invention, functioning in axial mode and supplied with particle-charged liquid via line 6, the particle-depleted liquid being evacuated via line 7.

The secondary filtration device comprises at least one guard layer 1, at least one holding layer 2, at least one deep filtration layer 3 and at least one protective layer 4 and 5.

Figure 3:
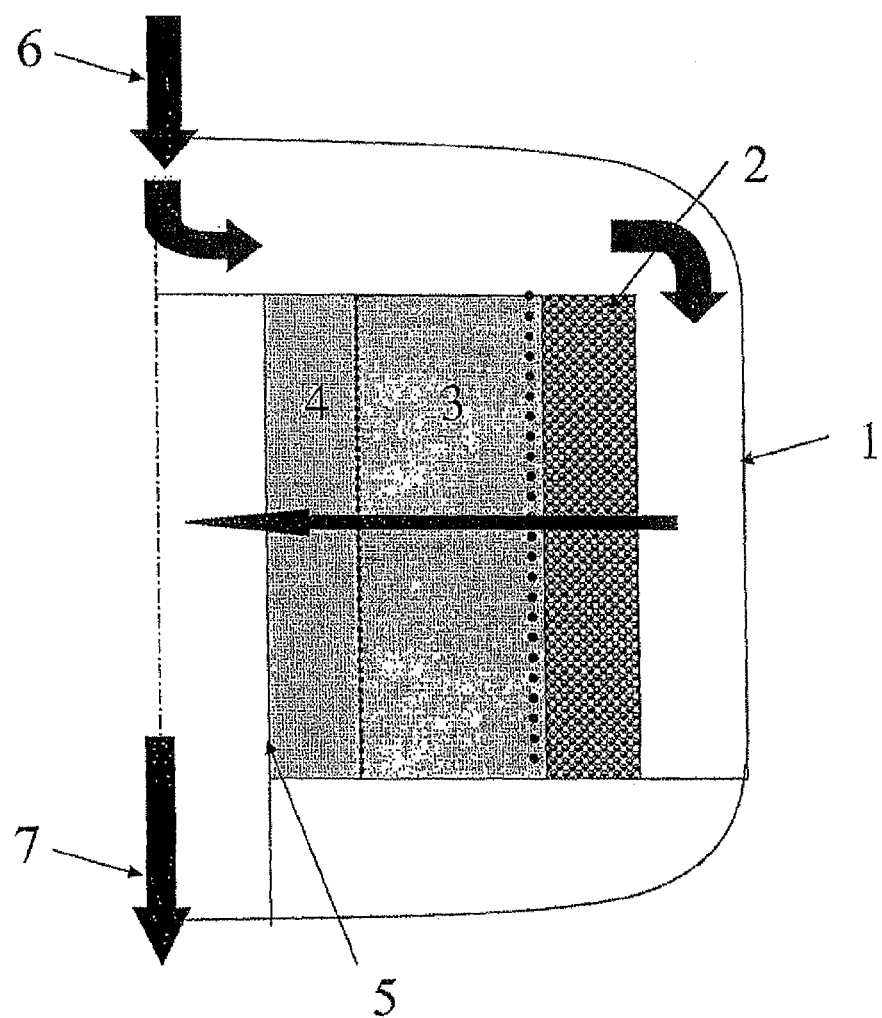
FIG. 3 shows a view of a radial secondary filtration bed of the invention with its various layers.

These same layers can be seen in the radial disposition shown in FIG. 3.

Identical numbers in FIGS. 2 and 3 denote the same elements. The description below is thus valid for the device of the invention both in axial mode (FIG. 2) and in radial mode (FIG. 3).

The first layer or holding layer 2 is generally constituted by inert macroporous particles with a diameter in the range of 1 to 3 mm, preferably in the range of 1.5 to 2.5 mm. The mean porosity of the holding layer is generally in the range of 60% to 75%, preferably in the range of 65% to 70% by volume. The porous surface offered by the holding layer is generally in the range of 100 to 200 $m^2/g$, preferably in the range of 150 to 180 $m^2/g$.

The second layer or deep filtration layer 3 is constituted by inert particles having a size distribution in the range of 0.4 to 80 microns, with a mean diameter in the range of 25 to 35 microns. The particle size distribution of said deep filtration layer is such that 5% to 20% of the volume of the layer is represented by particles with a diameter of less than 4 microns.

The porous surface offered by the deep filtration layer is generally in the range of 100 to 400 $m^2/g$, and preferably in the range of 200 to 300 $m^2/g$. The initial void fraction in the deep filtration layer is generally in the range of 0.20 to 0.45, preferably in the range of 0.25 to 0.4. During filtration, this void fraction reduces because solid particles are deposited within the deep filtration layer, resulting in an increase in the pressure drop through the device.

The top and bottom of the secondary filtration device must have one or more protective layers 1, 4 and 5 to prevent particles of the holding layer and/or the deep filtration layer constituting the secondary filtration bed from being entrained by the liquid phase.

These protective or guard layers are not distinctive elements of the present invention and may be of any type known to the skilled person. The secondary filtration bed is generally operated at a temperature in the range of 130° C. to 250° C. and preferably in the range of 150° C. to 230° C.

The superficial velocity of the fluid charged with fine particles within the filtration bed is generally in the range of 0.3 metres/hour to 1 metre/hour. The superficial velocity is defined as the ratio of the volume flow rate of feed to the void section of the filtration bed.

The thickness of the holding layer is preferably in the range of 0.3 metres to 2 metres, more preferably in the range of 0.5 metres to 1.0 metres. The thickness of the deep filtration layer is preferably in the range of 0.1 metres to 2 metres, and preferably in the range of 0.2 metres to 1.5 metres.

The filtration device of the invention may optionally contain a plurality of holding layers and a plurality of deep filtration layers, a holding layer preferably having a thickness of at least 0.3 metres, and a deep filtration layer preferably having a thickness of at least 0.1 metres.

The thickness limit for the secondary filtration bed is set by the pressure drop which must be below a limiting value dependant on the power of the pumps installed. In order to reduce the operating costs, the pressure drop is kept below 0.1 MPa, preferably below 0.05 MPa at the end of filtration.

The pressure drop increases with fine particle retention. When it reaches the limiting value described above, the filter is stopped to be emptied either by gravity or by evacuation from the top. All of the layers must be replaced before restarting the filter. One advantage of the invention is that if the feed, and thus the characteristics of the particles to be filtered changes with time, it is very easy to modify the thicknesses and/or type of filtration media used to optimize filtration under the new conditions.

The typical operating period for the secondary filtration system of the invention is at least 5 days, preferably at least 10 days.

EXAMPLES

The two examples below provide the principal dimensions of a secondary separation system of the invention in axial bed mode (example 1) and in radial bed mode (example 2).

The Fischer-Tropsch synthesis unit into which the secondary filtration device of the invention was incorporated comprised a SBC (slurry bubble column) type slurry reactor processing 30 tonnes/hour of a feed of synthesis gas under the following operating conditions:

temperature: 220° C.
pressure: 2.5 MPa.

The catalyst used was cobalt-based and the particles in suspension had a mean diameter of 150 microns including 300 ppm with a diameter of less than 25 microns.

The primary filtration system was constituted by an assembly of commercial filtration cartridges of the "Rigimesh K" type.

Example 1

According to the Invention, FIG. 2

In axial mode, the secondary filtration device was constituted by 4 filtration beds in parallel, one of which was disconnected to allow it to be discharged. Each filtration bed had a diameter of 5.3 metres and included the following 6 layers, from top to bottom:

1) a guard layer 1 with a height of 0.1 m, constituted by inert ¾ inch alumina beads;
2) a holding layer 2 with a height of 1.5 m, constituted by 2 mm SCM139XL type alumina bead particles;
3) a deep filtration layer 3 with a height of 1.2 metres, constituted by GA3001 type particles with a diameter in the range 20 microns to 30 microns;
4) a layer of sand 4 with a diameter in the range 40 microns to 315 microns;
5) a layer of sand with a diameter in the range 400 microns to 1000 microns (not shown in FIG. 2);
6) a layer of alumina beads with a diameter in the range 2 mm to 3 mm (not shown in FIG. 2);
7) a "Johnson" (or equivalent) type retaining screen 5

The cycle duration for a bed, i.e. its service life before disconnection, was 63 days. The particle content at the outlet from the secondary filtration unit was less than 5 ppm, and the effluent was completely white.

Example 2

According to the Invention, FIG. 3

In radial mode, the secondary filtration device was constituted by two radial beds, one or which was in the discharge condition. Each radial bed was composed of coaxial cylindrical layers. The external diameter of a bed was 6.4 metres and its total height was 8.7 metres.

From the outside to the inside, the fluid charged with solid particles traversed the following layers:

1) a guard layer 1 with a thickness of 0.1 m;
2) a holding layer 2 with a thickness of 0.5 metres, constituted by 2 mm SCM139XL type alumina bead particles;
3) a deep filtration layer 3 with a thickness of 1.2 metres, constituted by GA3001 type alumina particles with a diameter in the range 20 microns to 30 microns;
4) a guard layer 4 composed of particles with a diameter in the range 60 to 500 microns;
5) a "Johnson" (or equivalent) type retaining screen 5.

The service life of a bed was 62 days. The particle content at the outlet from the secondary filtration was less than 5 ppm and the effluent was completely white.

The diameter of the very reduced quantity of particles still present in the effluent from the secondary filtration was less than 0.2 microns, so that after cooling, the liquid effluent, essentially constituted by paraffins, was completely white. However, as soon as the effluent contained at least 10 ppm of particles, it normally turns grey. Thus, the visual test is precise and confirms the low particle content of the effluent.

The invention claimed is:

1. A downstream secondary separation device for the secondary separation of solid particles with a diameter of less than 50 microns in suspension in a liquid hydrocarbon phase, to be placed downstream of an upstream device for primary separation of said liquid hydrocarbon phase charged with solid particles, said downstream device comprising:
    a housing;
    at least one a holding layer constituted by inert macroporous particles with a diameter in the range of 1 to 3 mm positioned within said housing;
    at least one deep filtration layer constituted by inert particles with a size distribution in the range of 0.4 microns to 80 microns, with a mean diameter in the range of 25 microns to 35 microns positioned within said housing; and
    wherein said device has an axial bed or radial bed mode of operation.

2. A secondary separation device according to claim 1, wherein the at least one holding layer is constituted by particles with a diameter in the range of 1.5 mm to 2.5 mm.

3. A device for secondary separation according to claim 2, having a size distribution of particles of the at least one deep filtration layer such that 5% to 20% volume of the at least one deep filtration layer is represented by particles with a diameter of less than 4 microns.

4. A secondary separation device according to claim 3, having a mean porosity of the at least one holding layer in the range of 60% to 75%.

5. A secondary separation device according to claim 4, having a porous surface of the at least one holding layer in the range of 100 to 200 m$^2$/gram.

6. A secondary separation device according to claim 5, having an initial void fraction of the at least one deep filtration layer in the range of 0.2 to 0.45.

7. A device for secondary separation according to claim 1, wherein the size distribution of particles of the at least one deep filtration layer is such that 5% to 20% by volume of the at least one deep filtration layer is represented by particles with a diameter of less than 4 microns.

8. A secondary separation device according to claim 7, having an initial void fraction of the at least one deep filtration layer in the range of 0.2 to 0.45.

9. A secondary separation device according to claim 1, the at least one holding layer having has a mean porosity in the range of 60% to 75%.

10. A secondary separation device according to claim 1, having a porous surface of the at least one holding layer in the range of 100 to 200 m$^2$/gram.

11. A secondary separation device according to claim 1, wherein the total thickness of the at least one holding layer is in the range of 0.3 meters to 2 meters.

12. A secondary separation device according to claim 1, having an initial void fraction of the at least one deep filtration layer in the range of 0.2 to 0.45.

13. A secondary separation device according to claim 1, having a total thickness of the at least one deep filtration layer in the range of 0.1 meters to 2 meters.

14. A secondary separation process comprising passing a suspension through the device according to claim 1.

15. A process comprising passing a suspension containing Fischer-Tropsch hydrocarbon synthesis catalyst particles through the device according to claim 1 thereby separating the catalyst particles from the suspension.

16. In a system for conducting a Fischer-Tropsch hydrocarbon synthesis, said system comprising a slurry reactor having an outlet, a primary separator for separation of catalyst particles, in communication with said outlet, said primary separator having an outlet and a secondary separator in communication with said outlet of said primary separator, the improvement wherein the secondary separator is comprises a downstream secondary separation device according to claim 1, and wherein the layers of the secondary separation device are arranged such that the at least one holding layer is traversed before the at least one deep filtration layer.

17. A system according to claim 16, wherein the at least one deep filtration layer has an initial void fraction in the range of 0.2 to 0.45 and a size distribution such that 5% to 20% of said deep filtration layer is represented by particles having a diameter of less than 4 microns.

* * * * *

UNITED STATES PATENT AND TRADEMARK OFFICE
CERTIFICATE OF CORRECTION

Page 1 of 1

PATENT NO. : 8,092,694 B2
APPLICATION NO. : 12/158428
DATED : January 10, 2012
INVENTOR(S) : Nathalie Brunard et al.

It is certified that error appears in the above-identified patent and that said Letters Patent is hereby corrected as shown below:

On Front Page:

Section (73) reads: Assignees: IFP Energies Nouvelles, Ruiel Malmaison Cedex (FR); ENI S.p.A., San Donato Milanese, Milan (IT).

Should read: --Assignees: IFP Energies Nouvelles, Rueil Malmaison Cedex (FR); ENI S.p.A., San Donato Milanese, Milan (IT)--.

In The Claims:

In claim 9, at column 8, line 13 reads: "at least one holding layer having has a mean porosity in the"

Should read: --at least one holding layer has a mean porosity in the--.

In claim 16, at column 8, line 39 reads: "improvement wherein the secondary separator is comprises a"

Should read: --improvement wherein the secondary separator comprises a--.

Signed and Sealed this
Twentieth Day of March, 2012

David J. Kappos
*Director of the United States Patent and Trademark Office*